United States Patent
Sugano et al.

(10) Patent No.: US 10,344,388 B2
(45) Date of Patent: Jul. 9, 2019

(54) $CO_2$ REDUCTION CATALYST, $CO_2$ REDUCTION ELECTRODE, $CO_2$ REDUCTION REACTION APPARATUS, AND PROCESS FOR PRODUCING $CO_2$ REDUCTION CATALYST

(71) Applicant: Kabushiki Kaisha Toshiba, Minato-ku (JP)

(72) Inventors: Yoshitsune Sugano, Kawasaki (JP); Ryota Kitagawa, Tokyo (JP); Akihiko Ono, Tokyo (JP); Jun Tamura, Tokyo (JP); Yuki Kudo, Yokohama (JP); Masakazu Yamagiwa, Yokohama (JP); Eishi Tsutsumi, Kawasaki (JP); Satoshi Mikoshiba, Yamato (JP); Asahi Motoshige, Yokohama (JP); Arisa Yamada, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 198 days.

(21) Appl. No.: 15/262,362

(22) Filed: Sep. 12, 2016

(65) Prior Publication Data

US 2017/0073825 A1 Mar. 16, 2017

(30) Foreign Application Priority Data

Sep. 16, 2015 (JP) .................................. 2015-183470
Mar. 14, 2016 (JP) .................................. 2016-049887

(51) Int. Cl.
*C25B 11/04* (2006.01)
*C25B 11/03* (2006.01)
(Continued)

(52) U.S. Cl.
CPC ............. *C25B 11/0473* (2013.01); *C25B 1/04* (2013.01); *C25B 3/04* (2013.01); *C25B 11/035* (2013.01);
(Continued)

(58) Field of Classification Search
CPC ........... C25B 1/04; C25B 3/04; C25B 11/035; C25B 11/0473; C25D 3/48; C25D 5/54; C25D 7/0607
See application file for complete search history.

(56) References Cited

U.S. PATENT DOCUMENTS

| 4,498,962 A | 2/1985 | Oda et al. |
| 6,660,680 B1 | 12/2003 | Hampden-Smith et al. |

(Continued)

FOREIGN PATENT DOCUMENTS

| CN | 102688756 A | * 9/2012 | ............... C25D 5/48 |
| EP | 2 730 681 A1 | 5/2014 | |

(Continued)

OTHER PUBLICATIONS

Lin et al., Supplementary Materials of Chem. Commun., vol. 47, 2011.*

(Continued)

*Primary Examiner* — Jun Li
(74) *Attorney, Agent, or Firm* — Oblon, McClelland, Maier & Neustadt, L.L.P.

(57) ABSTRACT

According to one embodiment of a $CO_2$ reduction catalyst of the present invention, a conductive material is immersed in an aqueous solution containing a gold source, and a current or a potential is applied, whereby a highly active $CO_2$ reduction catalyst can be formed in a wide range portion on a surface of the conductive material. According to one embodiment of a $CO_2$ reduction catalyst of the present invention, in a $CO_2$ reduction reaction apparatus including a (Continued)

5.00 μm $CO_2$ reduction electrode having the $CO_2$ reduction catalyst, $CO_2$ is reduced.

9 Claims, 9 Drawing Sheets

(51) Int. Cl.
    *C25B 1/04* (2006.01)
    *C25B 3/04* (2006.01)
    *C25D 3/48* (2006.01)
    *C25D 5/54* (2006.01)
    *C25D 7/06* (2006.01)

(52) U.S. Cl.
    CPC .............. *C25D 3/48* (2013.01); *C25D 5/54* (2013.01); *C25D 7/0607* (2013.01)

(56) References Cited

U.S. PATENT DOCUMENTS

| | | | |
|---|---|---|---|
| 9,084,986 B2* | 7/2015 | Son | B01J 37/08 |
| 2003/0049517 A1 | 3/2003 | Hampden-Smith et al. | |
| 2010/0133111 A1 | 6/2010 | Nocera et al. | |
| 2011/0048943 A1* | 3/2011 | Nemes | G01N 27/4045 204/415 |
| 2013/0048506 A1 | 2/2013 | Chen | |
| 2013/0186771 A1 | 7/2013 | Zhai et al. | |
| 2014/0000157 A1* | 1/2014 | O'Connor | C07C 29/1518 44/388 |
| 2014/0339098 A1* | 11/2014 | Mazur | C25B 11/0447 205/555 |
| 2015/0096897 A1 | 4/2015 | Hashiba et al. | |
| 2015/0252482 A1 | 9/2015 | Ono et al. | |
| 2015/0252483 A1 | 9/2015 | Ono et al. | |
| 2016/0068974 A1 | 3/2016 | Oloman et al. | |

FOREIGN PATENT DOCUMENTS

| | | |
|---|---|---|
| JP | 61-25790 B2 | 6/1986 |
| JP | 10-290017 A | 10/1998 |
| JP | 2003-527735 A | 9/2003 |
| JP | 2003-308848 A | 10/2003 |
| JP | 2004-507341 A | 3/2004 |
| JP | 2008-173635 A | 7/2008 |
| JP | 2009-511740 A | 3/2009 |
| JP | 2010-255018 A | 11/2010 |
| JP | 2011-94194 A | 5/2011 |
| JP | 2012-55868 A | 3/2012 |
| JP | 2012-505310 A | 3/2012 |
| JP | 2012-112001 A | 6/2012 |
| JP | 2013-544957 A | 12/2013 |
| JP | 2014-101550 A | 6/2014 |
| JP | 2014-101551 A | 6/2014 |
| JP | 2014-175245 A | 9/2014 |
| WO | WO 01/93999 A2 | 12/2001 |
| WO | WO 2012/137240 A1 | 10/2012 |
| WO | WO 2013/005252 A1 | 1/2013 |
| WO | WO 2014/208019 A1 | 12/2014 |
| WO | WO 2015/178019 A1 | 11/2015 |

OTHER PUBLICATIONS

Machine translation of CN102688756, publication date Sep. 2012.*
Tai-Hsuan Lin, et al., "Potential-controlled electrodeposition of gold dendrites in the presence of cysteine," Chemical Communication, vol. 47, (2011), 9 pages.
Guotao Duan, et al., "Electrochemically induced flowerlike gold nanoarchitectures and their strong surface-enhanced Raman scattering effect," Applied Physics Letters, vol. 89, (2006), pp. 211905-1 to 211905-3.
Steven Y. Reece, et al., "Wireless Solar Water Splitting Using Silicon-Based Semiconductors and Earth-Abundant Catalysts," Science, vol. 334, Nov. 2011, 11 pages.
Shunsuke Sato, et al., "Selective $CO_2$ Conversion to Formate Conjugated with $H_2O$ Oxidation Utilizing Semiconductor/Complex Hybrid Photocatalysts," Journal of the American Chemical Society, vol. 133, No. 39, (2011), 14 pages.
Yihong Chen, et al., "Aqueous $CO_2$ Reduction at Very Low Overpotential on Oxide-Derived Au Nanoparticles," Journal of the American Chemical Society, Vo. 134, No. 49, (2012), 12 pages.
Wenlei Zhu, et al. "Monodisperse Au Nanoparticles for Selective Electrocatalytic Reduction of $CO_2$ to CO," Journal of the American Chemical Society, vol. 135, No. 45, (2013), 8 pages.
Yang Tian, et al., "Shape-Controlled Electrodeposition of Gold Nanostructures," The Journal of Physical Chemistry B, vol. 110, No. 46, (2006), pp. 23479-23481.
Satoshi Yotsuhashi, et al., "$CO_2$ Conversion with Light and Water by GaN Photoelectrode," Japanese Journal of Applied Physics (JJAP), vol. 51, No. 2S, (2012), pp. 02BP07-1 to 02BP07-3.

* cited by examiner

F I G. 6A 
F I G. 6B 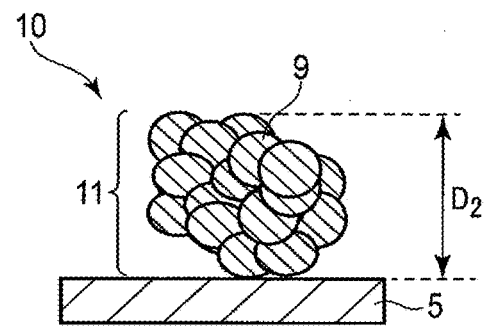
F I G. 6C 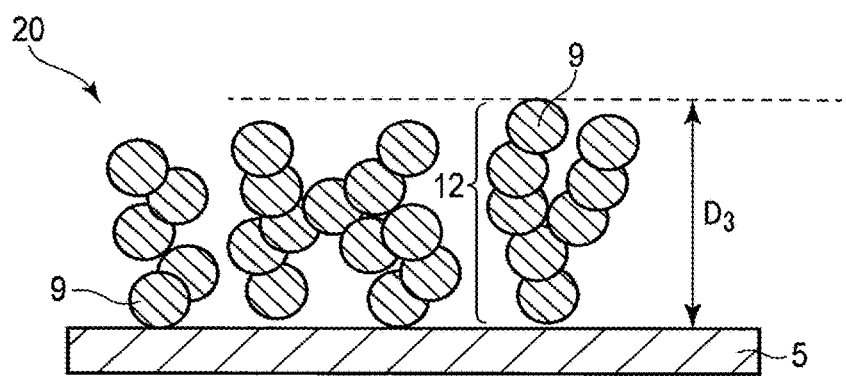

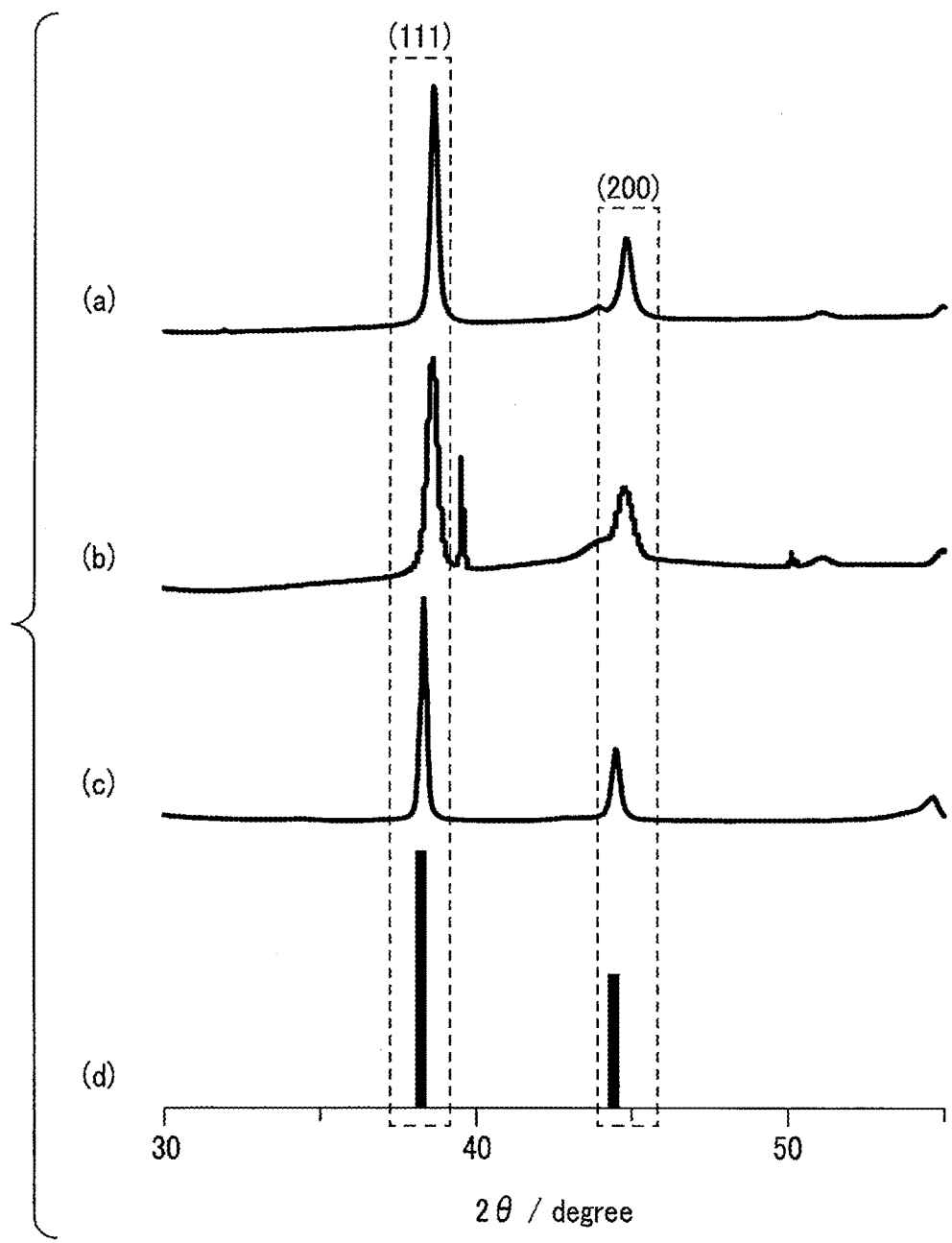
F I G. 13

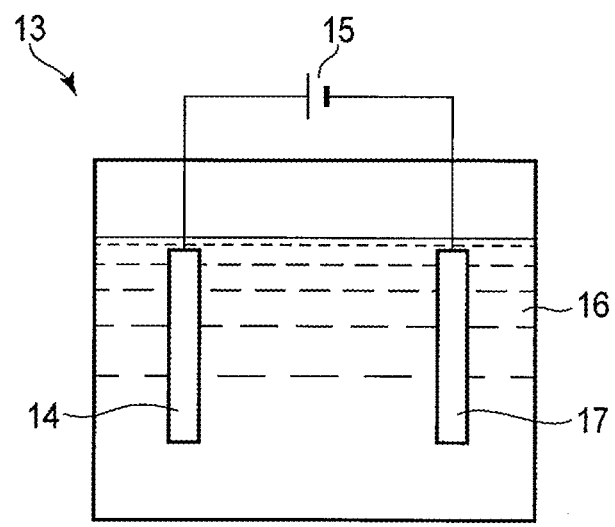
F I G. 14
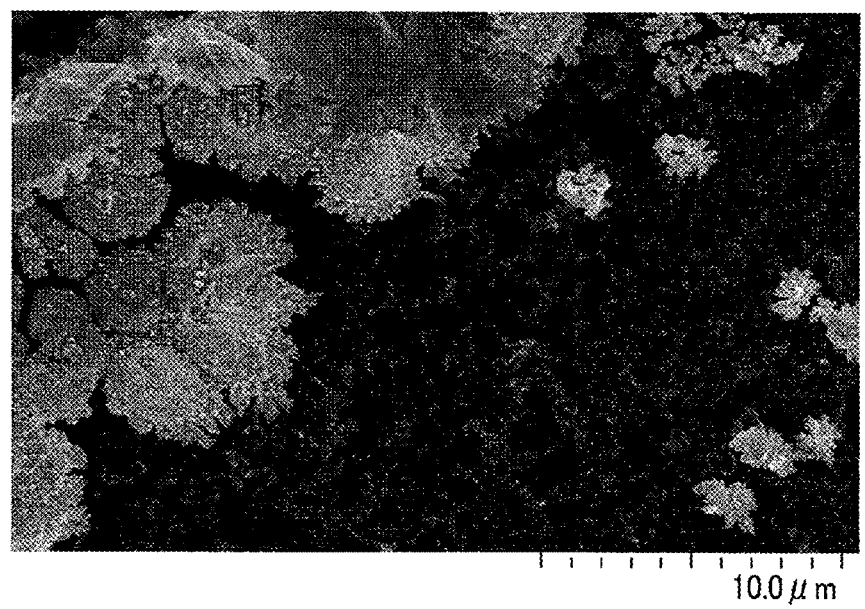
F I G. 15

US 10,344,388 B2

CO$_2$ REDUCTION CATALYST, CO$_2$ REDUCTION ELECTRODE, CO$_2$ REDUCTION REACTION APPARATUS, AND PROCESS FOR PRODUCING CO$_2$ REDUCTION CATALYST

CROSS-REFERENCE TO RELATED APPLICATION

This application is based upon and claims the benefit of priority from Japanese Patent Application No. 2015-183470 filed Sep. 16, 2015 and Japanese Patent Application No. 2016-049887 filed Mar. 14, 2016, and all of which are incorporated herein by reference.

FIELD

An embodiment of the present invention relates to a CO$_2$ reduction catalyst, a CO$_2$ reduction electrode, a CO$_2$ reduction reaction apparatus, and a process for producing a CO$_2$ reduction catalyst.

BACKGROUND

In recent years, from the viewpoint of energy problems and environmental issues, there have been developed artificial photosynthesis technologies to electrochemically convert the solar light into a chemical substance while imitating photosynthesis of plants. In these technologies, when the solar light is converted into a chemical substance and stored in a cylinder or tank, they have the advantages that the energy storage cost is lower and the loss caused by storage is smaller than those when the solar light is converted into electricity and the electricity is stored in a storage battery.

There has been being established a technique for taking hydrogen as a chemical substance (principally chemical fuel) from water. As an example using optical energy, there has been considered a photoelectrochemical reaction device using a laminate (such as a silicon solar cell) in which a photovoltaic layer is held between a pair of electrodes. In an electrode on a light irradiation side, water (2H$_2$O) is oxidized by light energy to obtain oxygen (O$_2$) and hydrogen ions (4H$^+$). In the electrode on the opposite side, hydrogen (2H$_2$) or the like as a chemical substance is obtained using the hydrogen ions (4H$^+$) produced at the electrode on the light irradiation side and a potential (e$^-$) generated in the photovoltaic layer. There has been also known a photoelectrochemical reaction device in which silicon solar cells are stacked (see, for example, (S. Y. Reece, et al., Science vol 334.pp.645(2011)). However, in those methods, although the conversion efficiency from solar light to chemical energy is high, it is inconvenient to store and transport produced hydrogen. In consideration of energy problems and environmental issues, it is preferable that solar light is converted into not hydrogen but a carbon compound which is easily stored and transported.

Meanwhile, a technique for highly efficiently converting abundant CO$_2$ into a chemical substance or the like useful as chemical fuel has not yet been established. As a photoelectrochemical reaction device using light energy, although it is a technique on a laboratory level, there has been known a system of a two-electrode system in which an electrode having a reduction catalyst reducing carbon dioxide (CO$_2$), for example, and an electrode having an oxidation catalyst oxidizing water (H$_2$O) are provided, and these electrodes are immersed in water dissolved with CO$_2$. In the electrode having the oxidation catalyst, as in the case where hydrogen is taken from water, H$_2$O is oxidized by light energy to obtain oxygen (½O$_2$), and, at the same time, obtain a potential. In the electrode having the reduction catalyst, a potential is obtained from an electrode inducing oxidation reaction, whereby CO$_2$ is reduced to produce formic acid (HCOOH) or the like (see, for example, S. Sato, et al., Journal of the American Chemical Society vol. 133.pp.15240(2011)). As other CO$_2$ reduction electrodes which have been reported so far, the electrodes described in JP 2011-094194A, Y. Chen, et al., Journal of the American Chemical Society vol. 134.pp.19969(2012) and W. Zhu, et al., Journal of the American Chemical Society vol. 135.pp.16833(2013), etc. are exemplified.

BRIEF DESCRIPTION OF THE DRAWINGS

FIG. 6A is a schematic diagram for explaining an embodiment of a CO$_2$ reduction electrode having a fine particle aggregate structure and shows an embodiment of a fine particle;

FIG. 6B is a schematic diagram for explaining the embodiment of the CO$_2$ reduction electrode having the fine particle aggregate structure and shows an embodiment of the CO$_2$ reduction electrode having an aggregate of fine particles;

FIG. 6C is a schematic diagram for explaining the embodiment of the CO$_2$ reduction electrode having the fine particle aggregate structure and shows an embodiment of the CO$_2$ reduction electrode having a site where fine particles are deposited;

FIG. 13 is a view showing a diffraction peak in XRD measurement in each of CO$_2$ reduction catalysts produced in Examples 1, 3, and 4 and a control CO$_2$ reduction catalyst;

FIG. 14 is a schematic diagram showing an embodiment of a CO$_2$ reduction reaction apparatus; and FIG. 15 is an image, which is observed by a scanning electron microscope, of a control $CO_2$ reduction electrode.

DETAILED DESCRIPTION

Figure 1:
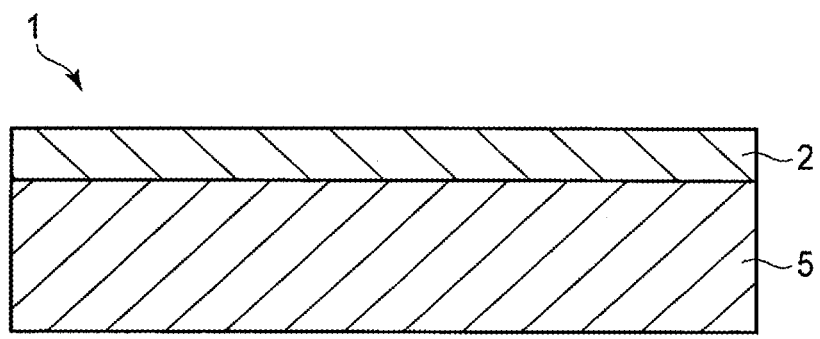
FIG. 1 is a schematic diagram showing an embodiment of a CO$_2$ reduction electrode.

A study conducted by the present inventors revealed that in a well-known $CO_2$ reduction electrode, although the activity of a $CO_2$ reduction catalyst is high, an increase in area is difficult, or, on the other hand, although the increase in area is easy, the faraday efficiency from $CO_2$ to CO (hereinafter referred to as "reduction selectivity of $CO_2$") is low.

The $CO_2$ reduction catalyst of an embodiment of the present invention is precipitated and formed by electrodeposition. According to the embodiment of the present invention, a conductive material is immersed in an aqueous solution containing a gold source, and a current or a potential is applied, whereby a highly active $CO_2$ reduction catalyst can be formed in a wide range portion on a surface of the conductive material. According to the embodiment of the present invention, in a $CO_2$ reduction reaction apparatus including a $CO_2$ reduction electrode having the $CO_2$ reduction catalyst, $CO_2$ is reduced.

The $CO_2$ reduction catalyst according to the embodiment of the present invention is precipitated and formed by electrodeposition. Here, the electrodeposition includes electroless plating which utilizes a difference in ionization tendency and the fact that the $CO_2$ reduction catalyst to be electrodeposited is charged up.

Further, the "$CO_2$ reduction catalyst" has a function of inducing production of a carbon compound by reduction reaction of $CO_2$, and the $CO_2$ reduction catalyst according to the present invention has at least partially a site capable of electrically reducing $CO_2$ (this site is hereinafter also referred to as the "$CO_2$ reducing site").

The $CO_2$ reduction catalyst of the present invention is equipped with a porous metal layer in one embodiment. The porous metal layer may include a partially nonporous portion and, that is, a bulky portion.

The porous metal layer preferably has a pore distribution of not less than 5 nm and not more than 20 µm. When the porous metal layer has the pore distribution, a catalyst activity can be enhanced. Here, the pore means a width of a gap seen in a cross section of 1 µm in a lateral direction. Further, the pore distribution means a distribution of the size of the pore (the width of the gap) occupied per unit length of an outermost surface in a cross section.

In the embodiment of the present invention, the porous metal layer preferably has a plurality of pore distribution peaks in the above range. Consequently, an increase in surface area, enhancement of diffusivity of ions and reactants, and high conductivity can be simultaneously achieved.

Examples of metal elements contained in the porous metal layer include transition metal elements such as Au, Ag, Cu, Pt, Ni, Zn, and Pd, alkali metal elements such as Na and K, and alkali earth metal elements such as Ca and Mg. The porous metal layer may contain a metal element as a simple substance or may contain metal elements in a form of a compound such as a metal oxide, a metal sulfide, a metal chloride, and a metal nitride.

In the embodiment of the present invention, the porous metal layer preferably has a $CO_2$ reducing site. The $CO_2$ reducing site may exist in a portion of a surface of the porous metal layer but may not cover the entire surface. It is more preferable that the porous metal layer and the $CO_2$ reducing site have electric conductivity.

Examples of a material which can constitute the $CO_2$ reducing site include a material which reduces active energy for reducing $CO_2$, that is, a material which reduces overvoltage occurring when a carbon compound is produced by reduction reaction of $CO_2$. For example, a metal material or a carbon material may be used. Examples of the metal material include Au, Ag, Cu, Pt, Ni, Zn, and Pd. Examples of the carbon material include carbon, graphene, carbon nanotube (CNT), fullerenes, and Ketjen black. This invention is not limited thereto, and as the $CO_2$ reducing site, a metal complex such as Ru complex or Re complex may be used. In addition, a plurality of materials may be mixed.

The $CO_2$ reducing site may have the same composition as that of the porous metal layer and may contain metals, metal compounds, metal complexes, and organic molecules having different compositions.

As described above, the $CO_2$ reduction catalyst has a function of inducing production of a carbon compound by reduction reaction of $CO_2$. A carbon compound produced by reduction reaction is different depending on kinds of the $CO_2$ reduction catalyst. Examples of the carbon compound include carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), acetaldehyde ($CH_3CHO$), acetic acid ($CH_3COOH$), ethylene glycol ($HOCH_2CH_2OH$), 1-propanol ($CH_3CH_2CH_2OH$), and isopropanol ($CH_3CHOHCH_3$).

The $CO_2$ reduction electrode according to the embodiment of the present invention is equipped with the $CO_2$ reduction catalyst according to the embodiment of the present invention and a conductive material having conductivity with the $CO_2$ reduction catalyst.

FIG. 1 is a schematic diagram showing a $CO_2$ reduction electrode 1 according to one embodiment of the present invention. In the $CO_2$ reduction electrode 1 shown in FIG. 1, a $CO_2$ reduction catalyst 2 is stacked on a conductive material 5, and the conductive material 5 and the $CO_2$ reduction catalyst 2 have electric conductivity.

The $CO_2$ reduction electrode according to the embodiment of the present invention may be in such a state that the conductive material and the $CO_2$ reduction catalyst have conductivity and is not limited to the configuration shown in FIG. 1. Further, in the $CO_2$ reduction electrode, the shape of the conductive material is not limited particularly, and the conductive material may have a thin film shape, a lattice shape, a particle shape, or a wire shape.

In another embodiment, a conductive material and a $CO_2$ reduction catalyst may be integrated in a $CO_2$ reduction electrode, and the $CO_2$ reduction electrode may be, for example, a single layer including both the conductive material and the $CO_2$ reduction catalyst having conductivity. When a photoelectric conversion element is used in a power element, the $CO_2$ reduction electrode may be a material capable of being in ohmic contact with an n-type semiconductor layer in the photoelectric conversion element.

As the conductive material, metal such as Au, Ag, Al, Pd, Sn, Bi, or Cu or an alloy material containing a plurality kinds of the metals, such as SUS, may be used. For example, when the conductive material is constituted of a substrate formed of the material, the mechanical strength of the $CO_2$ reduction electrode can be enhanced. Examples of the conductive material are not limited to those, and a light transmitting metal oxide such as ITO (Indium Tin Oxide: ITO), ZnO (zinc oxide), FTO (Fluorine-doped Tin Oxide), AZO (Aluminum-doped Zinc Oxide), and ATO (Antimony-doped Tin Oxide) may be used as the conductive material.

The conductive material that may be comprised by the $CO_2$ reduction electrode may be, for example, a laminate of a metal layer and a light transmitting metal oxide layer, a laminate including a metal layer and another conductive material layer, or a laminate including a light transmitting metal oxide layer and another conductive material layer.

Further, as the conductive material, a semiconductor substrate such as silicon and germanium, a conductive resin, or a conductive ion exchange membrane may be used. Furthermore, a resin material such as ionomer may be used.

The $CO_2$ reduction electrode may have a porous structure including pores through which an electrolytic solution can pass. The porous structure is formed by, for example, a method of etching a material having no pore and forming pores or a method using a porous material.

As a material applicable to the conductive material having the porous structure, in addition to the above materials, carbon black such as Ketjen black and Vulcan XC-7, activated carbon, and a metal fine powder may be used. For example, a material applicable to a $CO_2$ reduction catalyst having the porous structure may be used as the conductive material 5.

The porous structure of the conductive material may be a structure having a pore distribution of, for example, not less than 1 μm and not more than 2 cm. Here, the "pore" and the "pore distribution" are synonymous with those described in the porous metal layer.

In the $CO_2$ reduction electrode having a porous structure, a layer of $CO_2$ reduction catalyst containing fine particles of metal or alloy applicable to the $CO_2$ reduction catalyst may be deposited on a conductive material having such a porous structure. At this time, although fine particles may have a porous structure, it may not always have the porous structure based on conductivity and the relationship between the reaction site and material diffusion.

The $CO_2$ reduction electrode may have a through hole. The through hole is formed by removing a portion of the $CO_2$ reduction electrode by, for example, etching or the like. When the $CO_2$ reduction electrode is constituted of a plurality of layers, the through hole may be formed by a plurality of opening processes for forming a through hole for each layer. When the $CO_2$ reduction electrode has the porous structure, pores extending continuously may be regarded as through holes.

As described above, when the $CO_2$ reduction electrode has the porous structure or a through hole, diffusivity of ions and reactants can be enhanced through pores while securing high conductivity and a wide surface area of an active surface. With an increase in reactant mass due to an increase in the surface area of the active surface, although supply of a product and a raw material is limited by material diffusion, the problem due to limitation can be simultaneously solved by providing the porous structure.

It is preferable that the $CO_2$ reduction catalyst according to the embodiment of the present invention is equipped with a porous metal layer having a dendrite structure in one embodiment. In this case, it is preferable that the porous metal layer having the dendrite structure has the above-described $CO_2$ reducing site on at least a portion of a surface.

Figure 2:
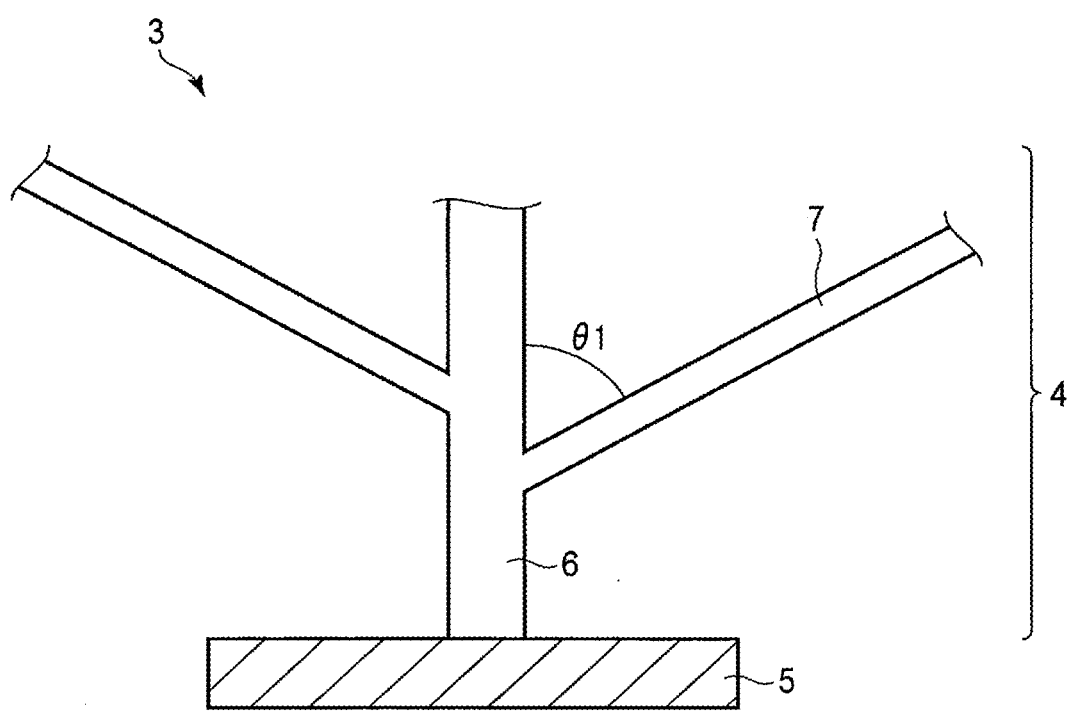
FIG. 2 is a schematic diagram showing an embodiment of a CO$_2$ reduction electrode having a dendrite structure.

Here, the dendrite structure is a structure having dendritic branching and represents a dendritic structure including a trunk (first generation) and a branch (second generation) which branches off from the trunk, for example. The dendrite structure may be a dendritic structure including a branch (third generation) which further branches off from the branch (second generation) or a dendritic structure further grown from the third generation. With reference to FIG. 2, a $CO_2$ reduction catalyst 4 has a dendrite structure including a trunk 6 and a plurality of branches 7 which branch off from the trunk 6.

When the $CO_2$ reduction catalyst has the dendrite structure, a porous structure having a large surface area can be formed.

The $CO_2$ reduction catalyst having the dendrite structure is obtained by, for example, immersing a conductive material in a solution containing a thiol derivative and a metal source, applying a potential having a constant frequency, and performing electrodeposition (T.-H. Lin, et al., Chemical Communications vol. 47. pp.2044(2011)).

In the above case, as a method of applying the potential having a constant frequency, a method of alternately applying two potentials which are different from each other and in which at least one of the potentials is baser than the reduction potential of the above-described metal source is preferable.

When a standard electrode potential is used as a reference, it is preferable that a maximum potential generated when a constant frequency is applied is higher than a reduction potential of a metal source to be electrodeposited, and it is preferable that a minimum potential is lower than the reduction potential of the metal source to be electrodeposited. Namely, the two potentials to be applied periodically vary from a value not less than the reduction potential of the metal source to be electrodeposited to a value not more than the reduction potential of the metal source to be electrodeposited. When the constant frequency is applied, the $CO_2$ reduction catalyst having the dendrite structure is formed.

The reduction potential shows a potential at which a metal species can shift from a certain positive valence to zero valence. Namely, the reduction potential means a potential at which, for example, $M^+$ is changed into $M^0$ and $M^{2+}$ is changed into $M^0$.

In the embodiment of the present invention, an electrolytic solution which can be used when the $CO_2$ reduction catalyst having the dendrite structure is produced is preferably an aqueous solution containing, for example, an organic molecule, such as a thiol derivative, and a metal source and may further contain acid.

Examples of a thiol derivative include alkane thiol such as ethane thiol, amino acid-based thiol such as cysteine and glutathione, and aromatic thiol such as sulfide.

Examples of a metal source include Au, Ag, Cu, Pt, Ni, Zn, and Pd.

Examples of acid include sulfuric acid, hydrochloric acid, nitric acid, carbonic acid, and organic acid.

A thickness of a layer of the $CO_2$ reduction catalyst having the dendrite structure is preferably not less than 1 μm and not more than 2 cm, for example. It is considered that it is preferable from the viewpoint of activity that the layer of the $CO_2$ reduction catalyst has a thickness not less than a certain value. On the other hand, when the layer of the $CO_2$ reduction catalyst has a thickness less than a certain value, it is considered that it is possible to suppress peeling from a substrate and obtain a stable catalyst. Here, the thickness of the layer of the $CO_2$ reduction catalyst means a length from a surface of a conductive material to the outermost surface of a layer formed perpendicular to the surface.

When a parameter of a constant frequency to be applied is adjusted, a potential not more than a reduction potential may be further lowered, for example. When the potential not more than the reduction potential is further lowered, or when a value of the frequency is reduced, a dendrite structure having a predetermined thickness can be formed more rapidly.

FIG. 2 is a schematic diagram showing an embodiment of a $CO_2$ reduction electrode having a dendrite structure. A $CO_2$ reduction electrode 3 having the dendrite structure shown in FIG. 2 is constituted of the conductive material 5 and the $CO_2$ reduction catalyst 4 having the dendrite structure, and the conductive material 5 and the $CO_2$ reduction catalyst 4 have electric conductivity.

In the embodiment of the present invention, in the $CO_2$ reduction electrode having the dendrite structure, an angle formed between a member included in the dendrite structure and a member which branches off from this member, that is, an angle formed between a trunk and a branch which branches off from the trunk, or an angle formed between a branch and another branch which further branches off from this branch (both the angles are usually the same) is preferably not less than 68 degrees and not more than 92 degrees. With reference to FIG. 2, an angle θ1 formed between the trunk 6 and the branch 7 which branches off from the trunk 6 is preferably not less than 68 degrees and not more than 92 degrees and more preferably not less than 68 degrees and not more than 72 degrees. When the $CO_2$ reduction catalyst 4 having the dendrite structure has an orientation, a selective $CO_2$ reduction activity can be exhibited. The $CO_2$ reduction electrode having the dendrite structure may grow to the third and subsequent generation, as described above. As a number of generations increases, the number of active sites is increased, and therefore, reaction is facilitated.

In the embodiment of the present invention, in the $CO_2$ reduction catalyst having the dendrite structure, a ratio ({111}/{100}) between a maximum value of peak strength deriving from a {111} plane and a maximum value of peak strength deriving from a {100} plane in X-ray diffraction (XRD) measurement is preferably not less than 2.0. When a structure in which many highly active crystal planes exist in $CO_2$ reduction reaction is formed, the selective $CO_2$ reduction activity can be exhibited. In one embodiment of the present invention, the maximum value of the peak strength is more preferably not less than 2.2 and still more preferably not less than 2.5.

Figure 3:
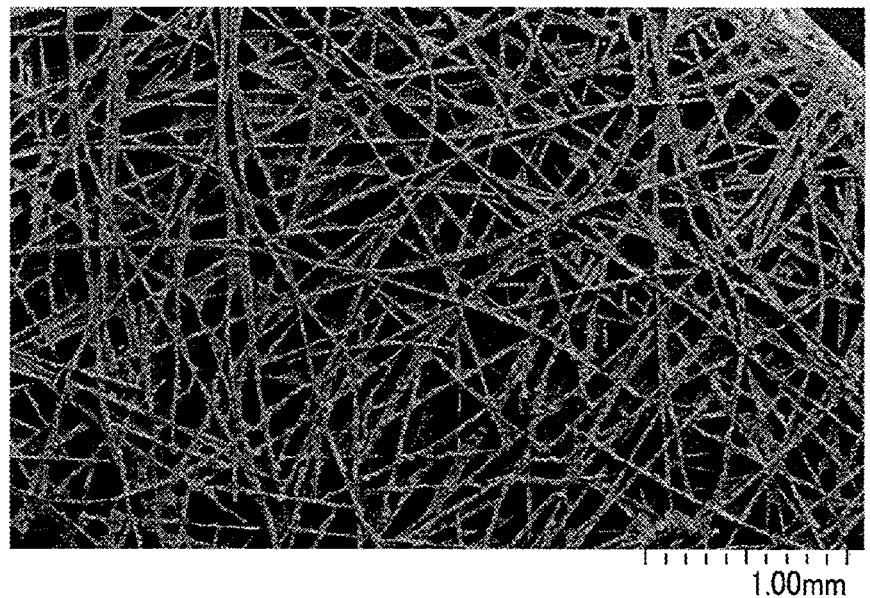
FIG. 3 is an image, which is observed by a scanning electron microscope in the embodiment, of the CO$_2$ reduction electrode having the dendrite structure.

FIG. 3 is an image, which is observed by a scanning electron microscope (SEM), of the $CO_2$ reduction electrode having a dendrite structure containing gold and produced in Example 1 to be described later.

The $CO_2$ reduction electrode shown in FIG. 3 is a $CO_2$ reduction electrode having a porous structure in which a porous metal layer having a dendrite structure is formed on a conductive material formed of wire-shaped carbon paper.

A portion other than a plane formed with a dendrite structure is sealed by a dicing film or the like.

Figure 4:
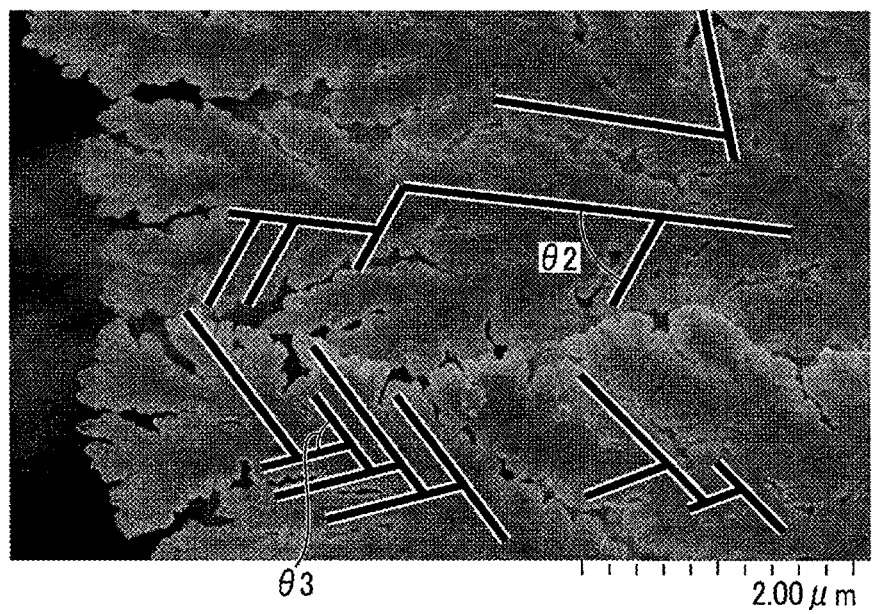
FIG. 4 is an image, which is observed by a scanning electron microscope in the embodiment, of the CO$_2$ reduction electrode having the dendrite structure.

FIG. 4 is an enlarged observation image of a site of the dendrite structure of the sample observed in FIG. 3. In the observation image shown in FIG. 4, when an angle θ2 formed between a trunk forming the dendrite structure and a branch which branches off from the trunk and an angle θ3 formed between a branch and another branch which further branches off from this branch are measured, it is found that these angles are each around 70 degrees. This is due to an intersection angle between the {111} planes deriving from a face-centered cubic lattice of gold.

Figure 5:
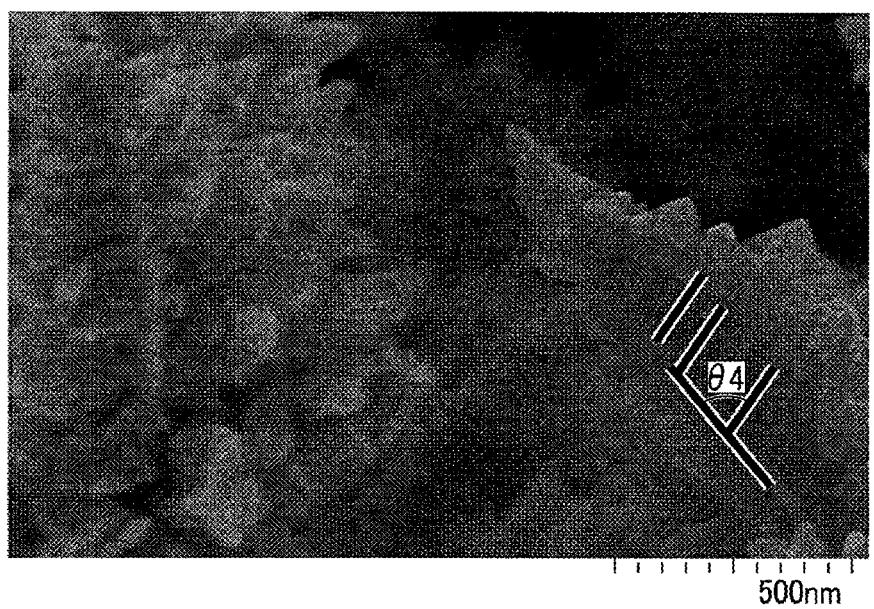
FIG. 5 is an image, which is observed by a scanning electron microscope in the embodiment, of the CO$_2$ reduction electrode having the dendrite structure.

FIG. 5 is an image, which is observed by SEM, of a $CO_2$ reduction catalyst having a dendrite structure containing gold and produced in Example 2 to be described later. In this embodiment, a nickel plate is used as a conductive material.

As shown in FIG. 5, when an angle θ4 formed between a trunk and a branch which branches off from the trunk is measured, it is found that the angle θ4 is around 70 degrees. This is due to the intersection angle between the {111} planes deriving from the face-centered cubic lattice of gold.

As described above, in each case, the structure deriving from the face-centered cubic lattice is formed on a substrate in a dendrite shape. This is because by virtue of the use of a thiol derivative such as cysteine, a thiol group selectively coordinates on the {100} plane and the {110} plane, whereby a shape is controlled. Consequently, a high surface area having a dendrite structure can be acquired.

In another embodiment, the $CO_2$ reduction catalyst according to the embodiment of the present invention is preferably equipped with a porous metal layer including an aggregate which is formed by aggregating fine particles having a primary particle diameter of not less than 10 nm and not more than 200 nm and has a secondary particle diameter of not less than 200 nm and not more than 10 μm, a porous metal layer including a site where fine particles having a particle diameter of not less than 10 nm and not more than 200 nm are deposited to a height of not less than 30 nm, or a porous metal layer including both the aggregate and the site. In this case, it is preferable that a porous metal layer has a $CO_2$ reducing site on at least a portion of the surface.

In this specification, the porous metal layer including the aggregate (hereinafter referred to as the "aggregate of this invention") which is formed by aggregating fine particles having a primary particle diameter of not less than 10 nm and not more than 200 nm and has a secondary particle diameter of not less than 200 nm and not more than 10 μm, the site (hereinafter referred to as the "deposition site of this invention") where fine particles having a particle diameter of not less than 10 nm and not more than 200 nm are deposited to a height of not less than 30 nm, or both the aggregate and the site is referred to as "a porous metal layer having a fine particle aggregate structure" or the like. Further, a $CO_2$ reduction catalyst equipped with the porous metal layer is referred to as "a $CO_2$ reduction catalyst having a fine particle aggregate structure" or the like. Furthermore, a $CO_2$ reduction electrode equipped with this $CO_2$ reduction catalyst is referred to as "a $CO_2$ reduction electrode having a fine particle aggregate structure".

When the $CO_2$ reduction catalyst includes the fine particle aggregate structure, a porous structure having a large surface area can be formed.

The $CO_2$ reduction catalyst having the fine particle aggregate structure according to the embodiment of the present invention is obtained by, for example, a method of immersing a conductive material in a solution containing a surfactant and a metal source, applying a constant reduction current, and preforming electrodeposition (G. Duan, et al., Applied Physics Letters vol. 89, pp.211905 (2006)).

When a standard electrode potential is used as a reference, it is preferable that a current value obtained when a constant reduction current is applied is a negative value. When the value of the applied current and concentrations of the surfactant and the metal source are changed, a size and the like are changed.

In the embodiment of the present invention, an electrolytic solution which can be used when the $CO_2$ reduction catalyst having the fine particle aggregate structure is produced contains a metal source. Examples of the metal source include Au, Ag, Cu, Pt, Ni, Zn, and Pd. In one embodiment, it is preferable that this electrolytic solution further contains a surfactant. Examples of the surfactant include a compound to be described later.

Further, in the embodiment of the present invention, it is preferable that the electrolytic solution which can be used when the $CO_2$ reduction catalyst having the fine particle aggregate structure is produced contains a metal source and further contains electrolytes such as acids, salts, and bases. When the electrolytic solution contains the electrolytes, a conductance of the electrolytic solution is enhanced, so that a $CO_2$ reduction catalyst formation rate can be significantly increased.

As acids, salts, and bases that can be used as electrolytes, those enhancing the conductivity as an electrolytic solution are preferable. Examples of acids include inorganic acids such as sulfuric acid, hydrochloric acid, nitric acid, phosphoric acid, boric acid, perchloric acid, and hydrofluoric acid and organic acids such as formic acid, acetic acid, citric acid, oxalic acid, and succinic acid. Further, a mixed acid such as aqua regia or a superacid such as trifluoromethanesulfonic acid or fluorosulfonic acid may be used. Further, examples of salts include sodium chloride and potassium sulfate. Further, examples of bases include inorganic bases such as sodium hydroxide and potassium carbonate and organic bases such as triethanolamine, trimethylamine, and pyridine. Furthermore, salts produced by combining those acids and bases or ionic liquids may be used.

The $CO_2$ reduction catalyst having the fine particle aggregate structure, according to the embodiment of the present invention can be electrodeposited on a conductive material by immersing the conductive material in an aqueous solution containing a metal source and an electrolyte, even if current is not applied thereto.

A thickness of a layer of the $CO_2$ reduction catalyst having the fine particle aggregate structure is preferably not less than 30 nm and not more than 2 cm, for example. If the layer does not have a thickness not less than a certain value, the number of active sites required for $CO_2$ reduction is small, and it is considered that the activity is lowered. On the other hand, when the layer has an excessive large thickness, peeling from a substrate is apt to occur, and it is considered that it is difficult to obtain a stable catalyst. Notably, a growth rate may be changed by adjusting a value of a constant current to be applied. Here, the thickness of the layer of the $CO_2$ reduction catalyst means a length from a surface of the conductive material to the outermost surface of a layer formed perpendicular to the surface.

FIGS. 6B and 6C are each a schematic diagram showing an embodiment of a $CO_2$ reduction electrode having a fine particle aggregate structure.

A $CO_2$ reduction electrode 10 shown in FIG. 6B has an aggregate 11 of the present invention on the conductive material 5. The aggregate 11 is an aggregate of FIG. 6A formed by aggregating fine particles 9 having a primary particle diameter $D_1$ in the range of not less than 10 nm and not more than 200 nm and has a secondary particle diameter $D_2$ in the range of not less than 200 nm and not more than 10 μm.

Here, the particle diameter $D_1$ of the fine particles 9 is a value measured by a measurement method in accordance with JISH 7803 or JISH 7805, for example.

The fine particles 9 and the aggregate 11 are, for example, an aggregate in which four or more adjacent fine particles 9 exist in one fine particle 9.

The secondary particle diameter $D_2$ of the aggregate 11 is a value measured by a measurement method in accordance with JISH 7803 or JISH 7805, for example.

A $CO_2$ reduction electrode 20 shown in FIG. 6C has a deposition site 12 according to the present invention on the conductive material 5. In the deposition site 12, the fine particles 9 of FIG. 6A having the particle diameter $D_1$ in the range of not less than 10 nm and not more than 200 nm are randomly deposited to a height $D_3$ of not less than 30 nm.

Here, the fact that fine particles are deposited shows a state in which three or less adjacent fine particles 9 exist in one fine particle 9, for example, and the deposition site 12 is different from the aggregate of fine particles as shown in FIG. 6B.

Further, the fact that fine particles are deposited to a height of not less than 30 nm means that as in $D_3$ shown in FIG. 6C, for example, a length from the surface of the conductive material 5 on which the fine particles 9 are deposited to the outermost surface of the deposition site is not less than 30 nm in a direction perpendicular to a plane. For example, the length can be measured from an image observed by SEM.

The $CO_2$ reduction catalyst having the fine particle aggregate structure according to the embodiment of the present invention may include at least one of the aggregates according to the present invention or may include the deposition site according to the present invention such that the deposition site has an area of squares of the thickness of the layer, for example.

In the $CO_2$ reduction catalyst having the fine particle aggregate structure according to the embodiment of the present invention, when the fine particle having the particle diameter $D_1$ has an orientation, the selective $CO_2$ reduction activity can be exhibited.

In the embodiment of the present invention, in the $CO_2$ reduction catalyst having the fine particle aggregate structure, the ratio ($\{111\}/\{100\}$) between the maximum value of the peak strength deriving from the $\{111\}$ plane and the maximum value of the peak strength deriving from the $\{100\}$ plane in XRD measurement is preferably not less than 2.0. When a structure in which many highly active crystal planes exist in $CO_2$ reduction reaction is formed, the selective $CO_2$ reduction activity can be exhibited. In one embodiment of the present invention, the maximum value of the peak strength is more preferably not less than 2.2 and still more preferably not less than 2.5.

Figure 7:
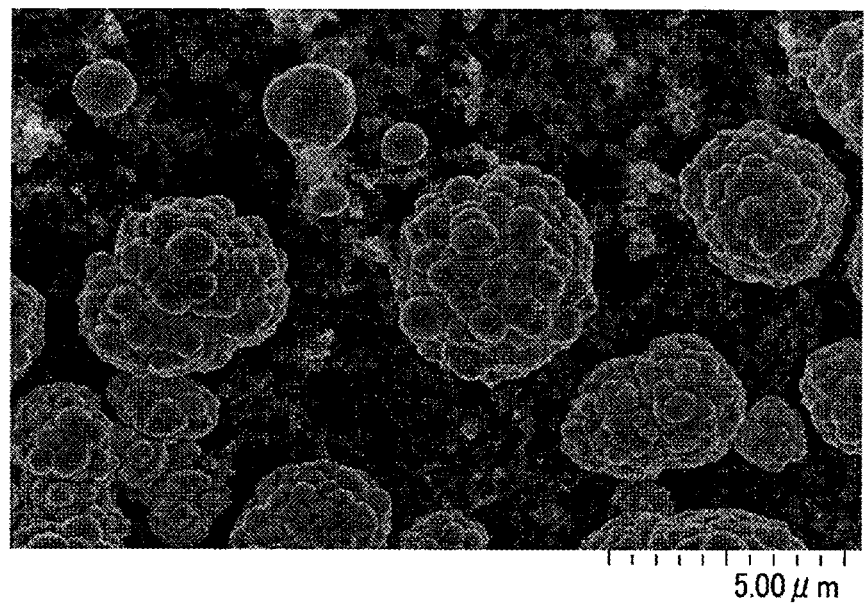
FIG. 7 is an image, which is observed by a scanning electron microscope in the embodiment, of the CO$_2$ reduction electrode having the fine particle aggregate structure.
Figure 10:
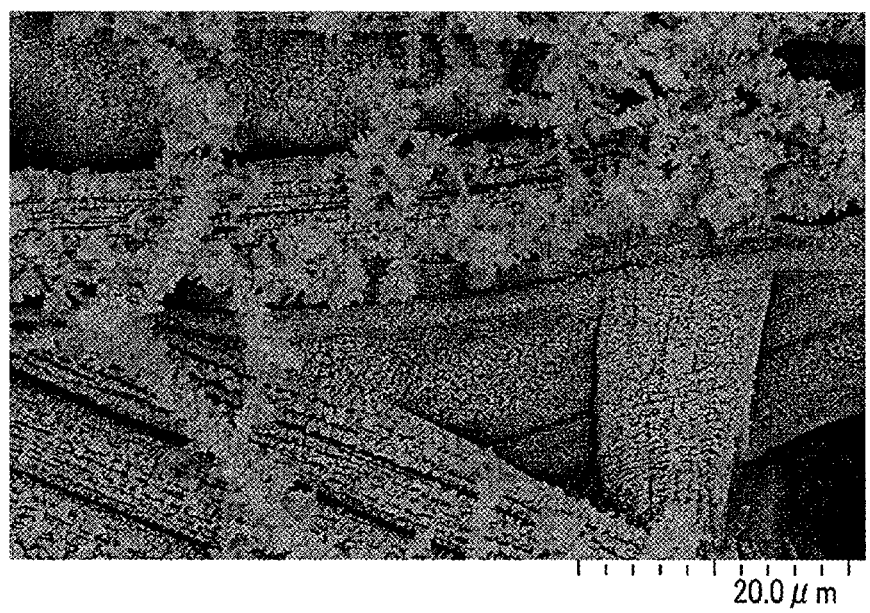
FIG. 10 is an image, which is observed by a scanning electron microscope in the embodiment, of the CO$_2$ reduction electrode having the fine particle aggregate structure.

FIGS. 7 and 10 are each an image, which is observed by SEM, of the $CO_2$ reduction electrode produced in Examples 3 and 4 to be described later and having an aggregate structure of fine particles containing gold.

The $CO_2$ reduction electrodes shown in FIGS. 7 and 10 each include both the aggregate according to the present invention and the deposition site according to the present invention. A portion other than a plane formed with an aggregate structure is sealed by a dicing film or the like.

Figure 8:
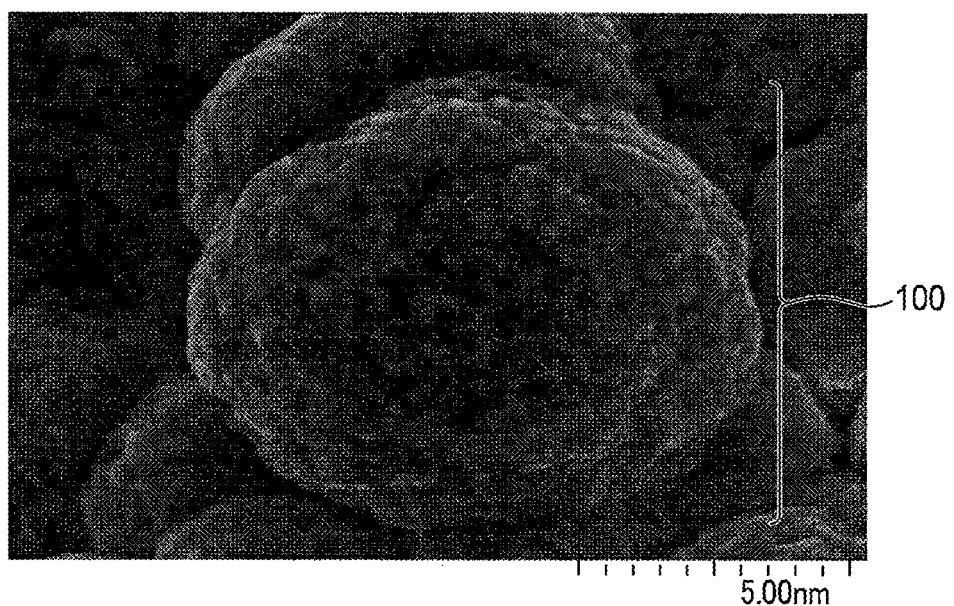
FIG. 8 is an image, which is observed by a scanning electron microscope in the embodiment, of the CO$_2$ reduction electrode having the fine particle aggregate structure.
Figure 9:
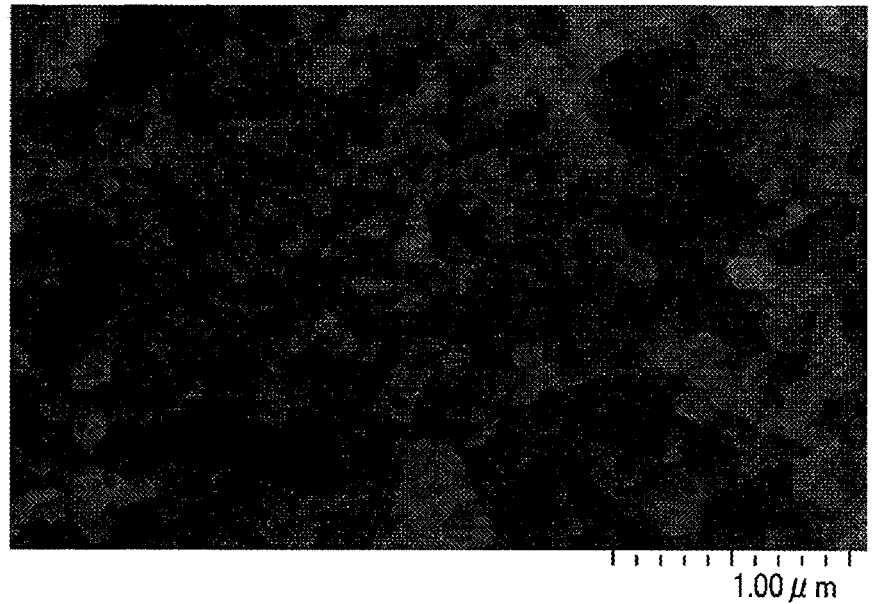
FIG. 9 is an image, which is observed by a scanning electron microscope in the embodiment, of the CO$_2$ reduction electrode having the fine particle aggregate structure.
Figure 11:
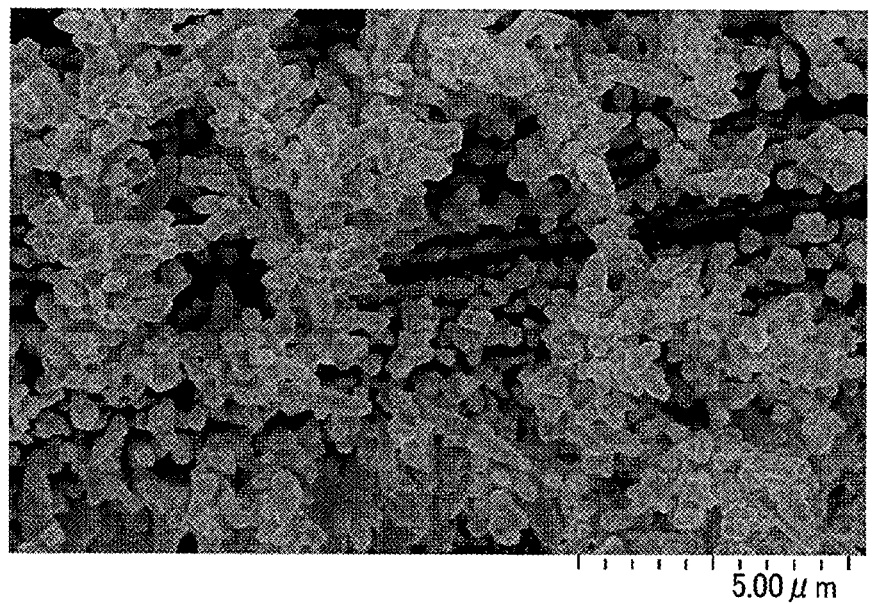
FIG. 11 is an image, which is observed by a scanning electron microscope in the embodiment, of the CO$_2$ reduction electrode having the fine particle aggregate structure.
Figure 12:
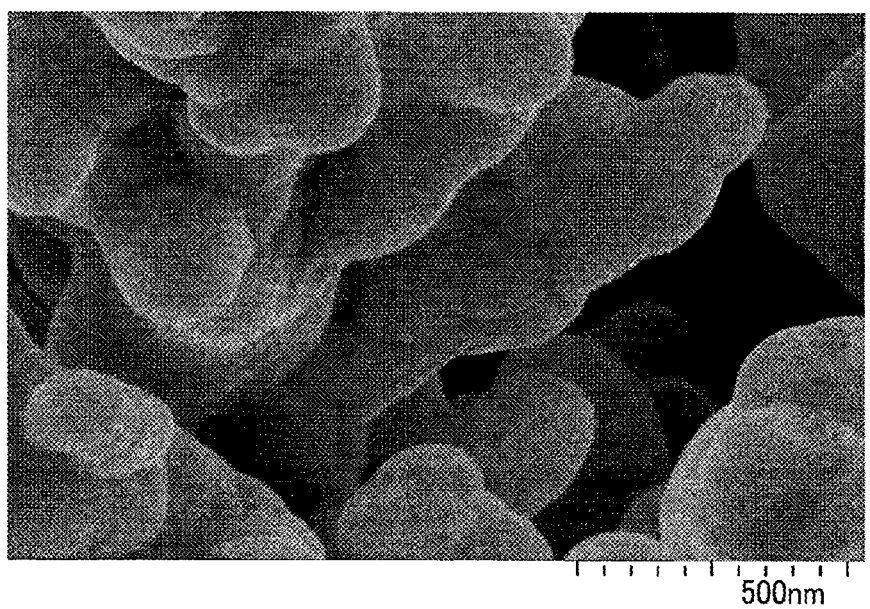
FIG. 12 is an image, which is observed by a scanning electron microscope in the embodiment, of the CO$_2$ reduction electrode having the fine particle aggregate structure.

FIGS. 8 and 9 are each an enlarged observation image of another site of a sample observed in FIG. 7. As seen in the observation image of FIG. 8, many aggregates 100 in which fine particles having a primary particle diameter of not less than 10 nm and not more than 200 nm and has a secondary particle diameter of not less than 200 nm and not more than 10 μm are deposited. As seen in the observation image of FIG. 9, an aggregate in which fine particles having a primary particle diameter of not less than 10 nm and not more than 200 nm are randomly deposited to a height of not less than 30 nm is formed. Similarly, FIGS. 11 and 12 are each an enlarged observation image of another site of a sample observed in FIG. 10, and as seen in FIG. 10, an aggregate in which fine particles having a primary particle diameter of not less than 10 nm and not more than 200 nm are randomly deposited to a height of not less than 30 nm is formed.

The $CO_2$ reduction catalyst having the fine particle aggregate structure according to the embodiment of the present invention preferably contains a surfactant. By virtue of the use of the surfactant, a gas produced after reaction is easily desorbed from a $CO_2$ reduction reaction apparatus.

Examples of the surfactant include vinyl compounds having a hydrophilic group, such as polyvinylpyrrolidone and polyvinyl alcohol, derivatives thereof, and polymers. Other materials may be used as long as they have functions equivalent to those.

The $CO_2$ reduction catalyst according to the embodiment of the present invention preferably contains an ion exchange resin. For example when an ion exchange resin such as Nafion (trade name) is used, adsorption of ions contributing to reaction can be controlled. Depending on the application, a material having a function conforming thereto may be used regardless of the kind of the ion exchange resin.

FIG. 14 is a schematic diagram showing a structural example of a $CO_2$ reduction reaction apparatus according to the embodiment of the present invention. A $CO_2$ reduction reaction apparatus 13 shown in FIG. 14 is equipped with an oxidation electrode 14 which oxidizes water, a $CO_2$ reduction electrode 17, a power supply element 15 have electric conductivity with the oxidation electrode 14 and the $CO_2$ reduction electrode 17, and an electrolytic solution 16 in contact with the oxidation electrode 14 and the $CO_2$ reduction electrode 17. Here, the $CO_2$ reduction electrode 17 is the $CO_2$ reduction electrode according to the embodiment of the present invention.

The power supply element 15 may be an electric power obtained from a system, an electric power obtained by converting kinetic energy, potential energy, thermal energy, or the like into electrical energy, an electric power obtained by converting light energy as in a solar cell or the like, an electric power obtained by converting chemical energy as in a fuel cell, a storage battery, or the like, or an electric power obtained by converting vibration such as sound.

The electrolytic solution 16 is stored in a vessel such as an electrolyte tank. The electrolytic solution 16 may be supplied through a supply flow path. In such a case, a heater or a temperature sensor may be provided in a portion of the supply flow path. Vaporized components of the electrolytic solution 16 may be filled in the vessel.

The electrolytic solution 16 contains water ($H_2O$) and carbon dioxide ($CO_2$). Examples of the electrolytic solution 16 include aqueous solutions containing phosphate ions ($PO_4^{2-}$), borate ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), and the like. For example, as the electrolytic solution 16, an aqueous solution containing $LiHCO_3$, $NaHCO_3$, $KHCO_3$, $CsHCO_3$, and the like may be used. The electrolytic solution 16 may contain alcohols such as methanol, ethanol, and acetone. An electrolytic solution in which the oxidation electrode 14 is immersed and an electrolytic solution in which the $CO_2$ reduction electrode 17 is immersed may be separate electrolytic solutions. At this time, it is preferable that the electrolytic solution in which the oxidation electrode 14 is immersed contains at least water, and the electrolytic solution in which the $CO_2$ reduction electrode 17 is immersed contains at least carbon dioxide. The production ratio of a carbon compound can be changed by changing an amount of water contained in the electrolytic solution in which the $CO_2$ reduction electrode 17 is immersed. Further, carbon dioxide may be blown by bubbling or the like.

As the oxidation electrode 14, there may be used an ionic liquid, which comprises a salt of a positive ion such as an imidazolium ion or a pyridinium ion and a negative ion such as $BF_4^-$ or $PF_6^-$ and is in a liquid state in a wide temperature range, and an aqueous solution of the ionic liquid. In addition, examples of the electrolytic solution 16 include an amine solution such as ethanolamine, imidazole, or pyridine and an aqueous solution thereof. Examples of amine include a primary amine, a secondary amine, and a tertiary amine.

Examples of a primary amine include a methylamine, ethylamine, propylamine, butylamine, pentylamine, and hexylamine. A hydrocarbon of the amine may be substituted with an alcohol, halogen, or the like. Examples of an amine whose hydrocarbon has been substituted include methanolamine, ethanolamine, and chloromethylamine. An unsaturated bond may exist. The substitution of hydrocarbons applies to a secondary amine and a tertiary amine as well.

Examples of a secondary amine include a dimethylamine, diethylamine, dipropylamine, dibutylamine, dipentylamine, dihexylamine, dimethanolamine, diethanolamine, and dipropanolamine. Substituted hydrocarbons may be different. This also applies to a tertiary amine. Examples of amines with different hydrocarbons include methylethylamine and methylpropylamine.

Examples of a tertiary amine include a trimethylamine, triethylamine, tripropylamine, tributylamine, trihexylamine, trimethanolamine, triethanolamine, tripropanolamine, tributanolamine, tripropanolamine, trihexanolamine, methyldiethylamine, and methyldipropylamine.

Examples of a cation in an ionic liquid include a 1-ethyl-3-methylimidazolium ion, 1-methyl-3-propylimidazolium ion, 1-butyl-3-methylimidazole ion, 1-methyl-3-pentylimidazolium ion, and 1-hexyl-3-methylimidazolium ion.

Position 2 of an imidazolium ion may be substituted. Examples of a cation in which the position 2 of an imidazolium ion has been substituted include a 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion, and 1-hexyl-2,3-dimethylimidazolium ion.

Examples of a pyridinium ion include methylpyridinium, ethylpyridinium, propylpyridinium, butylpyridinium, pentylpyridinium, and hexylpyridinium. For both imidazolium ion and pyridinium ion, an alkyl group may be substituted and an unsaturated bond may exist.

Examples of an anion include a fluoride ion, chloride ion, bromide ion, iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(trifluoromethoxysulfonyl)imide, and bis(perfluoroethylsulfonyl)imide. A dipolar ion made by binding a cation and an anion in an ionic liquid with a hydrocarbon may be used as well.

It is preferable that pH of the electrolytic solution in which the $CO_2$ reduction electrode 17 is immersed is lower than pH of an electrolytic solution in which an oxidation electrode is immersed. Consequently, hydrogen ions, hydroxide ions, and the like easily move. A potential difference between liquids due to a difference in pH can be effectively used in oxidation/reduction reaction.

The electrolytic solution in which the $CO_2$ reduction electrode 17 is immersed and the electrolytic solution in which the oxidation electrode is immersed can be separated using an ion exchange membrane. The ion exchange membrane has a function of allowing some ions contained in the electrolytic solution 16 in which the both electrodes are immersed to pass therethrough, that is, a function of shielding one or more kinds of ions contained in the electrolytic solution 16. According to this constitution, pH can be made different between two electrolytic solutions, for example.

Examples of an ion exchange membrane include cation exchange membranes, such as Nafion (trade name) and Flemion (trade name), and anion exchange membranes, such as Neoceptor (trade name) and Celemion (trade name). When movement of ions between two electrolyte solutions is not required to be controlled, an ion exchange membrane may not be always provided.

A $CO_2$ reduction catalyst can be regenerated from a deteriorated state due to cleaning according to electrical oxidation/reduction such as CV, addition of a compound having cleaning action, or a cleaning effect of heat, light, or the like. Further, it is preferable that a $CO_2$ reduction electrode can be used in such regeneration of the $CO_2$ reduction catalyst or can be resistant to this. Furthermore, it is preferable that a $CO_2$ reduction reaction apparatus has such a function of regenerating the $CO_2$ reduction catalyst.

Further, the $CO_2$ reduction reaction apparatus may be equipped with a stirrer in order to accelerate supply of ions or substances to an electrode surface.

Further, the $CO_2$ reduction reaction apparatus may be equipped with a measurement instrument such as a thermometer, a pH sensor, a conductivity measurement device, an electrolytic solution analyzer, or a gas analyzer, and it is preferable that by virtue of the provision of these measurement instruments, a parameter in the $CO_2$ reduction reaction apparatus can be controlled.

The $CO_2$ reduction reaction apparatus may be a batch type reaction apparatus or a circulation type reaction apparatus. When the $CO_2$ reduction reaction apparatus is the circulation type reaction apparatus, it is desirable that a supply flow path and a discharge flow path for an electrolytic solution are secured.

The oxidation electrode and the $CO_2$ reduction electrode of the $CO_2$ reduction reaction apparatus may be partially in contact with an electrolytic solution.

Further, the $CO_2$ reduction reaction apparatus may be equipped with an electrolytic membrane (ion exchange membrane). According to this constitution, an anion or a cation can be selectively circulated, and the electrolytic solutions in contact respectively with the oxidation electrode and the $CO_2$ reduction electrode may be different materials, so that $CO_2$ reduction reaction can be promoted by a difference in ionic strength and a difference in pH.

Next, an operation example of the $CO_2$ reduction reaction apparatus will be described. As an example, a case where carbon monoxide is produced will be described. First, electrons from a power supply element are gathered to a $CO_2$ reduction electrode. Then, reduction reaction of $CO_2$ occurs as shown in the following formula (1), and $CO_2$ and hydrogen ions are reacted to produce carbon monoxide which is a carbon compound and water (when an electrolytic solution is alkaline, hydroxide ions are produced). Carbon monoxide is dissolved at any proportion in an electrolytic solution. The number of planes of a $CO_2$ reduction electrode having a porous structure where the $CO_2$ reduction reaction occurs is larger than that in a $CO_2$ reduction electrode which does not have a porous structure. The produced carbon compound may be recovered through a recovery flow path provided in a recovery vessel for the electrolytic solution.

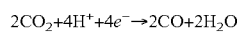

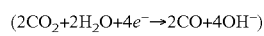
The formula (1):

On the other hand, in the oxidation electrode, oxidation reaction of water occurs as shown in the following formula (2) to produce oxygen and hydrogen ions (when an electrolytic solution is alkaline, water is produced), and electrons flow to the power supply element.

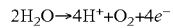

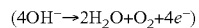
The formula (2):

The hydrogen ions (water) produced by the oxidation reaction move to the $CO_2$ reduction electrode.

At that time, the power supply element is required to have an open voltage not less than a potential difference between a standard oxidation-reduction potential in the oxidation reaction and a standard oxidation-reduction potential in the reduction reaction. For example, the standard oxidation-reduction potential in the reduction reaction in the formula (1) is −0.10 [V], and the standard oxidation-reduction potential in the oxidation reaction in the formula (2) is 1.23 [V]. Thus, the voltage applied from the power supply element is required to be not less than 1.33 [V]. More preferably, the voltage applied from the power supply element is required to be not less than a potential difference including an overvoltage. For example, when the overvoltage in the reduction reaction in the formula (1) and the overvoltage in the oxidation reaction in the formula (2) are each 0.2 [V], the voltage to be applied is preferably not less than 1.73 [V].

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the forms of the embodiments described herein may be made without departing from the spirit of the inventions. The accompanying claims and their equivalents are intended to cover such forms or modifications as would fall within the scope and spirit of their spirit of the inventions.

EXAMPLES

Example 1

Production Example of $CO_2$ Reduction Electrode Having Dendrite Structure

Carbon paper (SIGRACET (trade name) Gas Diffusion Media type GDL 25AA manufactured by SGL Group) as a conductive material was immersed in an aqueous solution containing chlorauric acid (1 mM), cysteine (0.1 mM), and sulfuric acid (0.5M).

Then, two potentials (−0.8 to 0.2 V (vs SCE)) including at least one potential baser than the reduction potential of gold are applied for two minutes at a constant frequency (5 Hz), whereby a $CO_2$ reduction electrode having a dendrite structure was produced.

As described above, an image, observed by SEM, of the $CO_2$ reduction electrode having a dendrite structure obtained in Example 1 is shown in FIG. 3, and an enlarged image of a site of its porous metal layer observed by SEM is shown in FIG. 4.

This $CO_2$ reduction electrode is a $CO_2$ reduction electrode having a porous structure in which a porous metal layer having a dendrite structure is formed on a conductive material formed of wire-shaped carbon paper.

Example 2

Production Example (1) of $CO_2$ Reduction Catalyst Having Dendrite Structure

A $CO_2$ reduction catalyst having a dendrite structure was produced under the same conditions as those in Example 1, except that a nickel plate was used.

As described above, an image, observed by SEM, of the $CO_2$ reduction catalyst having a dendrite structure obtained in Example 2 is shown in FIG. 5.

Example 3

Production Example of $CO_2$ Reduction Catalyst Having Fine Particle Aggregate Structure Carbon paper (SIGRACET (trade name) Gas Diffusion Media type GDL 25AA manufactured by SGL Group) as a conductive material was immersed in an aqueous solution containing chlorauric acid (25 mM) and polyvinylpyrrolidone (PVP, 20 g/L).

Then, a constant current of −0.25 mA/cm² was applied for 36 minutes, whereby a $CO_2$ reduction catalyst having a porous metal layer including an aggregate of fine particles and a site where fine particles are randomly deposited was produced.

As described above, images, observed by SEM, of the $CO_2$ reduction catalyst having a fine particle aggregate structure obtained in Example 3 are shown in FIGS. 7 to 9. As seen in those drawings, an aggregate which is formed by aggregating fine particles having a primary particle diameter of not less than 10 nm and not more than 200 nm and has a secondary particle diameter of not less than 200 nm and not more than 10 μm and a site where fine particles having a primary particle diameter of not less than 10 nm and not more than 200 nm are randomly deposited to a height of not less than 30 nm are formed.

This $CO_2$ reduction electrode is a $CO_2$ reduction electrode having a porous structure in which a porous metal layer having a fine particle aggregate structure is formed on a conductive material formed of wire-shaped carbon paper.

Example 4

Production Example (2) of $CO_2$ Reduction Catalyst Having Aggregate of Fine Particles Carbon paper (SIGRACET (trade name) Gas Diffusion Media type GDL 25AA manufactured by SGL Group) as a conductive material was immersed in an aqueous solution containing chlorauric acid (3 mM) and sulfuric acid (0.5M).

Then, a constant voltage of −0.5 V (vs Ag/AgCl sat'd KCl) was applied until all of the reaction charge amounts reached 200 c, whereby a $CO_2$ reduction catalyst having a porous metal layer including an aggregate of fine particles and a site where fine particles are randomly deposited was produced.

As described above, images, observed by SEM, of the $CO_2$ reduction catalyst having a fine particle aggregate structure obtained in Example 4 are shown in FIGS. 10 to 12. As seen in those drawings, a site where fine particles having a primary particle diameter of not less than 10 nm and not more than 200 nm are randomly deposited to a height of not less than 30 nm are formed.

This $CO_2$ reduction electrode is a $CO_2$ reduction electrode having a porous structure in which a porous metal layer having a fine particle aggregate structure is formed on a conductive material formed of wire-shaped carbon paper.

In the $CO_2$ reduction catalyst obtained by a synthesis method in Example 4, since a fine particle diameter and a thickness of a catalyst layer can be controlled by uniquely operating a voltage to be applied and concentrations, the $CO_2$ reduction catalyst is excellent in that a catalyst having an activity meeting a purpose is easily synthesized. In addition, an aggregate of fine particles having a particle diameter of not less than 200 nm and not more than 10 μm is less likely to be produced, and a crystal plane is not widely formed in a specific direction; therefore, many crystal planes and grain boundaries are formed, so that a high activity is obtained.

<Evaluation>
[XRD Measurement]

For the $CO_2$ reduction catalyst having a dendrite structure obtained in Example 1 and the $CO_2$ reduction catalyst having a fine particle aggregate structure obtained in Example 3, diffraction peaks through X-ray diffraction (XRD) were measured. On the other hand, the diffraction peak of JCPDS (04-0784) as control gold was measured by XRD measurement. The measurement results are shown in FIG. 13. (a) is the diffraction peak of Example 1, (b) is the diffraction peak of Example 3, (c) is the diffraction peak of Example 4, and (d) is the diffraction peak of control gold.

Table 1 shows, for each sample, a ratio ({111}/{100}) between a maximum value of peak strength deriving from a {111} plane and a maximum value of peak strength deriving from a {100} plane, in the diffraction peak shown in FIG. 13.

As seen in Table 1, as compared with a peak strength ratio deriving from gold described in JCPDS (04-0784), the peak strength ratios of the $CO_2$ reduction catalysts in Examples 1 and 3 are high. This shows that the {111} plane is selectively formed as compared with the {100} plane, and when a structure in which many highly active crystal planes exist in $CO_2$ reduction reaction is formed, the selective $CO_2$ reduction activity can be exhibited.

TABLE 1

| Electrode | Ratio of peak strength maximum value ({111}/{100}) |
|---|---|
| $CO_2$ reduction electrode having dendrite structure in Example 1 | 2.24 |
| $CO_2$ reduction electrode having aggregate of fine particles in Example 3 | 2.88 |
| $CO_2$ reduction electrode having aggregate of fine particles in Example 4 | 2.97 |
| Control JCPDS (04-0784) | 1.92 |

[$CO_2$ Reduction Selectivity]

For the $CO_2$ reduction electrode having a dendrite structure obtained in Example 1 and the $CO_2$ reduction electrodes having a fine particle aggregate structure obtained in Examples 3 and 4, production selectivity of carbon monoxide (CO) in $CO_2$ reduction reaction was measured.

For control, an electrode produced based on the description in Y. Tian, et al., The Journal of Physical Chemistry B vol. 110.pp.23478(2006) (hereafter, referred to as Tian et al) was used. Specifically, a conductive material was immersed in an aqueous solution in which perchloric acid (0.1M) and chlorauric acid (4 mM) were dissolved, and an electrode (see Tian et al.) produced by applying a voltage of −0.08 V to an Ag/AgCl (saturated KCl) reference electrode was used.

FIG. 15 shows a SEM observation image of the electrode produced based on Tian et al.

$CO_2$ reduction reaction was performed using a $CO_2$ reduction reaction apparatus. $CO_2$ was blown at 200 mL/min using an airtight H-cell equipped with a $CO_2$ reduction electrode normalized to 1 cm², a platinum electrode as an oxidation electrode, an aqueous potassium carbonate solution (0.25M) saturated with dissolved $CO_2$ as an electrolytic solution (each cell: 30 mL), and a Nafion membrane as an anion exchange membrane, and a constant current of −2 mA was applied using an Ag/AgCl (saturated KCl) electrode as a reference electrode.

The measurement results of CO production selectivity and the potential applied to the $CO_2$ reduction electrode during reaction are shown in Table 2.

TABLE 2

| Electrode | CO production selectivity/% | Voltage applied to electrode/ V (vs RHE) |
|---|---|---|
| $CO_2$ reduction electrode having dendrite structure in Example 1 | 85 | −0.4349 |
| $CO_2$ reduction electrode having aggregate of fine particles in Example 3 | 92 | −0.4604 |
| $CO_2$ reduction electrode having aggregate of fine particles in Example 4 | 82 | −0.3414 |
| Control electrode of Tian et al | 39 | −0.6916 |

<Method of Measuring CO Production Selectivity>

A gas composition was analyzed by gas chromatography, and liquid composition was analyzed by ion chromatography. A ratio of the production amount of CO of the production amount of a reduction/reaction product was measured as the CO production selectivity.

As seen in Table 2, in the $CO_2$ reduction electrodes produced in Examples 1, 3, and 4, the selectivity is higher than that of the electrode produced based on Tian et al., and CO is obtained at a lower applied voltage. Main examples of products other than CO include hydrogen.

What is claimed is:

1. A $CO_2$ reduction catalyst precipitated and formed by electrodeposition, wherein said $CO_2$ reduction catalyst is equipped with a porous metal layer, the porous metal layer including an aggregate, wherein the aggregate is formed by aggregating fine particles having a primary particle diameter of not less than 10 nm and not more than 200 nm and has a secondary particle diameter of not less than 200 nm and not more than 10 μm, or the porous metal layer including a site where fine particles having a particle diameter of not less than 10 nm and not more than 200 nm are deposited to a height of not less than 30 nm, or the porous metal layer including both the aggregate and the site, and the porous metal layer has a site, which electrically reduces $CO_2$, at least a portion of a surface thereof.

2. The $CO_2$ reduction catalyst according to claim 1, further comprising a thiol derivative.

3. The $CO_2$ reduction catalyst according to claim 1, wherein in the porous metal layer, a ratio ({111}/{100}) between a maximum value of peak strength deriving from a {111} plane and a maximum value of peak strength deriving from a {100} plane in X-ray diffraction measurement is not less than 2.0.

4. The $CO_2$ reduction catalyst according to claim 1, further comprising a surfactant.

5. A $CO_2$ reduction electrode comprising a conductive material and the $CO_2$ reduction catalyst according to claim 1 having conductivity with the conductive material.

6. The $CO_2$ reduction electrode according to claim 5, comprising a porous structure or a through hole.

7. A $CO_2$ reduction reaction apparatus comprising:
an oxidation electrode which oxidizes water;
the $CO_2$ reduction electrode according to claim 5;
a power supply element which have electric conductivity with the oxidation electrode and the $CO_2$ reduction electrode; and
an electrolytic solution in contact with the oxidation electrode and the $CO_2$ reduction electrode.

8. A process for producing the $CO_2$ reduction catalyst according to claim 1, comprising:
immersing a conductive material in an aqueous solution containing a metal source and a surfactant; and
applying a constant reduction current to precipitate the $CO_2$ reduction catalyst on the conductive material.

9. A process for producing the $CO_2$ reduction catalyst according to claim 1, comprising:
immersing a conductive material in an aqueous solution containing a metal source and an electrolyte; and
precipitating the $CO_2$ reduction catalyst on the conductive material.

* * * * *